(12) United States Patent
Cannella et al.

(10) Patent No.: US 7,412,407 B1
(45) Date of Patent: Aug. 12, 2008

(54) METHOD FOR ELECTRONICALLY PUBLISHING A SINGLE ORGANIZATION'S REQUIREMENTS IN AN ELECTRONIC PUBLICATION

(75) Inventors: Timothy Patrick Cannella, Yorktown, VA (US); Zopalla Deyar Brown, Newport News, VA (US); Julia B. Leverenz, Williamsburg, VA (US); Teresa Marie Danforth, Lanexa, VA (US); Shannan Dyan Kyte, Williamsburg, VA (US); Karen Congiu Dempster, Yorktown, VA (US)

(73) Assignee: Jefferson Science Associates, Newport News, VA (US)

( * ) Notice: Subject to any disclaimer, the term of this patent is extended or adjusted under 35 U.S.C. 154(b) by 494 days.

(21) Appl. No.: 10/663,276

(22) Filed: Sep. 16, 2003

(51) Int. Cl.
*G06F 17/30* (2006.01)
*G06Q 30/00* (2006.01)

(52) U.S. Cl. .......................... 705/26; 705/27
(58) Field of Classification Search ............. 705/26–27, 705/37, 1
See application file for complete search history.

(56) References Cited

U.S. PATENT DOCUMENTS 5,727,156 A * 3/1998 Herr-Hoyman et al. ..... 709/219
2001/0029473 A1 * 10/2001 Yamaoka et al. .............. 705/27
2002/0007324 A1 * 1/2002 Centner et al. ................ 705/26
2002/0052807 A1 * 5/2002 Han et al. ...................... 705/27
2003/0216975 A1 * 11/2003 Montey et al. ................ 705/28
2004/0128622 A1 * 7/2004 Mountain et al. ........... 715/530

OTHER PUBLICATIONS

Craigslist San Francisco Bay Area [online], [retrieved on Sep. 5, 2006], Retrieved from www.archive.org the Internet Wayback Machine <URL: http://www.craigslist.com> dated Feb. 2, 2001.*
"Net News; Flea Market Concept Goes Virtual". Charles Stough Dayton Daily News. Dayton, Ohio: Jun. 5, 1999. p. 3.G. [recovered from Proquest database Sep. 5, 2006].*

* cited by examiner

*Primary Examiner*—Jeffrey A. Smith
*Assistant Examiner*—William J. Allen

(57) ABSTRACT

A system for electronically publishing the requirements of a buyer that reduces the time and paperwork required by vendors to transact business with the buyer. The electronic publication includes one or more categorized lists of items that the buyer is seeking to procure. Each listed item includes the name of the item, a brief description of the item, the name of a contact person within the buyer's organization, and one or more dates relevant to the item. The name of the item is presented as a hyperlink that leads to a detailed description of the item and a list of electronically editable forms required by the buyer. The name of the contact person is also presented as a hyperlink that leads to contact information for the contact person. Within the electronic publication, vendors can register with the buyer regarding any listed item(s). Registered vendors receive automatic updates relating to items for which they registered. An administration section, accessible only to the buyer, allows the buyer to organize information and forms submitted by the vendors.

10 Claims, 10 Drawing Sheets

| (NAME OF BUYER'S ORGANIZATION) 100 |

| SEARCH   CONTACT US   105 |

WELCOME

(General information about the organization.)

(Purpose of this electronic publication)

(Special programs supported by the organization.)

110

CATEGORIES OF REQUIREMENTS

Supply

Services

Construction (other categories)

115

| ADMIN ACCESS   120 |

Figure 1

(NAME OF BUYER'S ORGANIZATION) 100

HOME    SEARCH    CONTACT US    200

SUPPLY

205

| Solicitation | Description | Contact | Date Posted | Last Updated |
|---|---|---|---|---|
| Modelocked Laser | Modelocked laser with pulse repetition rate 499 MHz, synchronized to ... | Tim Cannella | 9/24/02 | 9/24/02 |
| Airside Components | Amend. #1, Due date 8/20/02 | Tim Cannella | 7/17/02 | 8/9/02 |
| SNS RF Cables | Awarded | Tim Cannella | 6/25/02 | 7/17/02 |

SERVICES

210

| Solicitation | Description | Contact | Date Posted | Last Updated |
|---|---|---|---|---|
| Food Services | Provide, manage and operate food services, including cafeteria, catering and vending... | Julie Leverenz | 4/16/02 | 5/7/02 |
| Material Services | Material services support, including shipping and receiving, mail services, warehouse and supply... | Julie Leverenz | 1/10/02 | 4/10/02 |
| (Name of required service) | (Description of service required by buyer) | (Name) | #/#/# | #/#/# |

Figure 2

(NAME OF BUYER'S ORGANIZATION) 100

HOME    SEARCH    CONTACT US    200

CONSTRUCTION

300

| Solicitation | Description | Contact | Date Posted | Last Updated |
|---|---|---|---|---|
| Mechanical Systems Upgrade - HVAC | Modifications to and replacement of the heating ventilating and air conditioning system components... | Ross Small | 3/20/02 | 7/11/02 |
| Chiller Plant Expansion | Modifications to the chilled water plant in Test Lab basement, installation of an underground... | Ross Small | 4/25/02 | 8/29/02 |
| (Name of required construction) | (Description of construction required by buyer) | (Name) | #/#/# | #/#/# |

Figure 3

| (NAME OF BUYER'S ORGANIZATION) 100 |

| HOME    SEARCH    CONTACT US    200 |

SUPPLY

400

| | |
|---|---|
| Title:<br>(Solicitation #) | Modelocked Laser<br>(####) |
| Date Posted: | 9-24-02                           | Updated: 9-24-02 |
| Closing Date: | 10-4-02 |
| Contact: | Tim Cannella |
| Description: | Modelocked laser with pulse repetition rate 499 MHz, pulse repetition rate synchronized to an external radio frequency reference. |
| Documents: | Document                                     Last Modified<br>Request for Quote (doc)                    9-24-02<br>Commercial Terms and Conditions (doc)       9-24-02<br>Full Text of Commercial Clauses (doc)       9-24-02 |
| Small Business Set Aside: | No |
| (Other information) | |

| REGISTER FOR THIS OPPORTUNITY    405 |

Figure 4

| (NAME OF BUYER'S ORGANIZATION) 100 |

| HOME   SEARCH   CONTACT US   200 |

Register for Modelocked Laser

<sub>500</sub>

| Company: | | Point of Contact: | |
|---|---|---|---|
| Street Mailing Address: | | | |
| City: | | State: | |
| Zip Code: | | Fax: | |
| E-mail Address: | | Phone: | |

| Business Status: | Small ○ | Large ○ | Other |

| Preferred Contact Method: | Email ○ | Fax ○ | Other |

REGISTER

Figure 5

(NAME OF BUYER'S ORGANIZATION) 100

Add New Solicitation    Edit Solicitation    Main Bulletin Board    600

Admin. Index

605

| SUPPLY: | Modelocked Laser | 1 |
| | Airside Components | 2 |
| | SNS RF Cables | 3 |
| | (other Supplies) | # |
| SERVICES: | Food Services | 1 |
| | Material Services | 2 |
| | (other Services) | # |
| CONSTRUCTION | Mechanical Systems Upgrade - HVAC | 1 |
| | Chiller Plant Expansion | 2 |
| | (other Construction requirements) | # |
| (Other) | (List) | # |

Order Topics
610

Figure 6

| (NAME OF BUYER'S ORGANIZATION) 100 |
|---|

| Admin Index | Add New Solicitation | Main Bulletin Board | 700 |
|---|---|---|---|

Edit Modelocked Laser

705

| | |
|---|---|
| Project Name: | Modelocked Laser |
| Solicitation #: | #### |
| Date Posted: | 9-24-02 |
| Closing Date: | 10-4-02 |
| Registration End Date: | 10-2-02 |
| Buyer: | Tim Cannella |
| Buyer Phone #: | (757) 555-7060 |
| Buyer Email: | tcannella@jlab.org |
| Detailed Description: | Modelocked Laser with pulse repetition rate 499 MHz, ... |
| Small Business Set Aside: | No |
| Section: | Supply |

| Edit Solicitation | 710 |
|---|---|
| Remove Solicitation | 715 |

Add Document
Remove Document
View Vendor List
Existing Documents
View Excel File

(NAME OF BUYER'S ORGANIZATION) 100

| Admin Index | Add New Solicitation | Main Bulletin Board | 700 |

Vendors for:

Modelocked Laser  800

| | | |
|---|---|---|
| Polytec PI | (email address) | Delete Subscription |
| Tidewater Technical Services | (email address) | Delete Subscription |
| (other Vendors) | (email addresses) | Delete Subsciption |

Solicitation Documents for:

Modelocked Laser  805

| | |
|---|---|
| Request for Quotes | 1 |
| Commercial Terms and Conditions | 1 |
| Full Text of Commercial Clauses | 1 |
| (Other Documents) | # |

Figure 8

METHOD FOR ELECTRONICALLY PUBLISHING A SINGLE ORGANIZATION'S REQUIREMENTS IN AN ELECTRONIC PUBLICATION

The United States of America may have certain rights to this invention under Management and Operating Contract No. DE-AC05-84ER40150 from the Department of Energy.

BACKGROUND OF THE INVENTION

The present invention relates generally to the field electronic publishing and more specifically to method of publishing the requirements of a buyer.

Electronic publishing is typically accomplished by posting information on the Internet. Posting information traditionally includes the use of webpages or electronic bulletin boards. The Internet and most intranets are based on the concept of a client-server relationship between computers, also called a client/server architecture. To access information on the Internet or an intranet, a user must first log on, or connect, to the client computer's host network. This connection can be established with or without user intervention depending on the software. Once a connection has been established, the user may request information from or send information to a remote server. If the information requested by the user resides on one of the computers on the host network, that information is quickly retrieved and sent to the user's terminal. If the information requested by the user is on a server that does not belong to the host Local Area Network (LAN), then the host network connects to other networks until it makes a connection with the network containing the requested server. During their travels across the Internet, requests and responses will likely encounter one or more gateways and routers. Gateways are located between computer networks and enable a network operating according to one protocol to pass messages to a second network working to a different protocol. A router is a device that determines the best connection path between networks and helps networks to make connections. Once the client computer makes a connection with the server containing the requested information, the server sends the information to the client in the form of a file. A special computer program called a browser enables the user to view the file. Examples of Internet browsers are Mosaic, Netscape, and Internet Explorer. Non-multimedia documents do not need browsers to view their text-only contents and many multimedia documents provide access to text-only versions of their files. The process of retrieving files from a remote server to the user's terminal is called downloading. The process sending files to a remote server from a user's terminal is called uploading.

Webpages and electronic bulletin boards are usually stored on special computers known as servers, which are commonly accessed via the Internet. The Internet is an association of computer networks with common standards, which enable information to be sent from any host on one network to any host on another network. Originally developed in the 1970's to support military research, it has since grown and expanded to support commercial, educational, and other users. The World Wide Web is an Internet facility designed for multimedia use, in which individuals or organizations make available 'pages' of information to other users anywhere in the world. Access to these pages can be at no cost or, in the case of certain commercial operations, a fee can be required before access is granted.

The Internet provides many services to its users. E-mail is probably the most popular service. E-mail can be a simple text message that is typed at the user's keyboard, which is then sent to another user on the network. In the same way that a letter must be addressed correctly to reach its destination, an e-mail message must also specify the address of the person it is being sent to. The biggest advantage of using e-mail is that it reaches its destination much faster than traditional mail, usually in a matter of a few seconds. File Transfer Protocol (FTP) is known for easy downloading of public domain software and shareware programs. Bulletin Board Systems (BBS) are an electronic version of traditional bulletin boards found in public areas. Bulletin boards originated to provide users who have similar interests with a method of keeping in touch and sharing information. A BBS user "posts" messages or files about all kinds of subjects, and anyone who can access the BBS can view and respond to the messages.

Multimedia documents found on the World Wide Web are called Web pages. Linking information together with hyperlinks is accomplished by special computer programs or computer languages. Computer languages used to create Web pages include HyperText Markup Language (HTML) and JAVA. A multimedia device should have a keyboard and a pointing device, such as a mouse or pen, so that the user can direct the associations between multimedia elements. Photographs, drawings, and other still images must be changed into a format that the computer can manipulate and display. Such formats include bit-mapped graphics and vector graphics. Bit-mapped graphics store, manipulate, and represent images as rows and columns of tiny dots. In a bit-mapped graphic, each dot has a precise location described by its row and column, much like each house in a city has a precise address. Some of the most common bit-mapped graphics formats are called Graphical Interchange Format (GIF), Tagged Image File Format (TIFF), and Windows Bitmap (BMP). Vector graphics use mathematical formulas to recreate the original image. In a vector graphic, the dots are not defined by a row-and-column address, rather they are defined by their spatial relationships to one another. Because their dot components are not restricted to a particular row and column, vector graphics can reproduce images more easily and thus provide better output on most video screens and printers. Common vector graphics formats are Encapsulated Postscript (EPS), Windows Metafile Format (WMF), Hewlett-Packard Graphics Language (HPGL), and Macintosh graphics file format (PICT).

SUMMARY OF THE INVENTION

A method for electronically publishing a buyer's requirements that also provides vendors with all of the information, including required forms, needed to do business with the buyer. The method includes the creation of individual lines of electronic communication between the buyer and the vendors. The website or electronic bulletin board reduces the amount of paperwork and time required by vendors to conduct business with the buyer. The electronic publication comprises a categorized posting of the buyer's requirements that are easily recognizable to the vendors, each category includes one or more items required by the buyer and an item can be a product or a service required by the buyer. Multiple fields are used to provided information about each required item within a category. The fields include: name; description; contact person; and one or more fields for dates relating to the item. The contact person can be an employee of the buyer or merely a person with knowledge of the item. The name of the contact person is preferably presented as a hyperlink to an e-mail account of the contact person. The electronic publication also includes all forms and information necessary for the vendors to conduct business with the buyer. The forms include a request for information form, and quotes and proposals forms. The forms are preferably presented in a format that allows editing of the forms by the vendors and electronic submission of edited forms to the buyer.

A registration link is provided that allows the vendors to register with the buyer, wherein registered vendors can receive electronic notifications concerning updates of any item specified by the vendors during registration. The present postings are easily accessible to the buyer and the vendors and the buyer is able to update descriptions of items and the forms necessary for the vendors, at any time. The present electronic publication may also include one or more drawings, figures and pictures for viewing and possible download by the vendors, wherein the drawings, figures and pictures aid in conveying the buyer's requirements to the vendors.

It is an object of the present invention to draw the attention of an increased number of vendors to the needs of a buyer.

It is a further object of the present invention to reduce the amount of time and paperwork required by a vendor to do business with a buyer.

It is a further object of the present invention to provide a rapid means of communication between the buyer and vendors so that relevant business communications are expedited.

BRIEF DESCRIPTION OF THE DRAWINGS

The invention of the present application will now be described in more detail with reference to the accompanying drawings, given only by way of example, in which:

FIG. 1 shows an exemplary home page of the present system;

FIG. 2 shows exemplary categorized lists of requirements;

FIG. 3 shows another list of requirements in a category;

FIG. 4 shows an exemplary detailed description of a requirement;

FIG. 5 shows an exemplary registration page for a vendor;

FIG. 6 shows an exemplary administration page;

FIG. 7 shows another exemplary administration page;

FIG. 8 shows another exemplary administration page;

DETAILED DESCRIPTION OF THE INVENTION

Figure 9A:
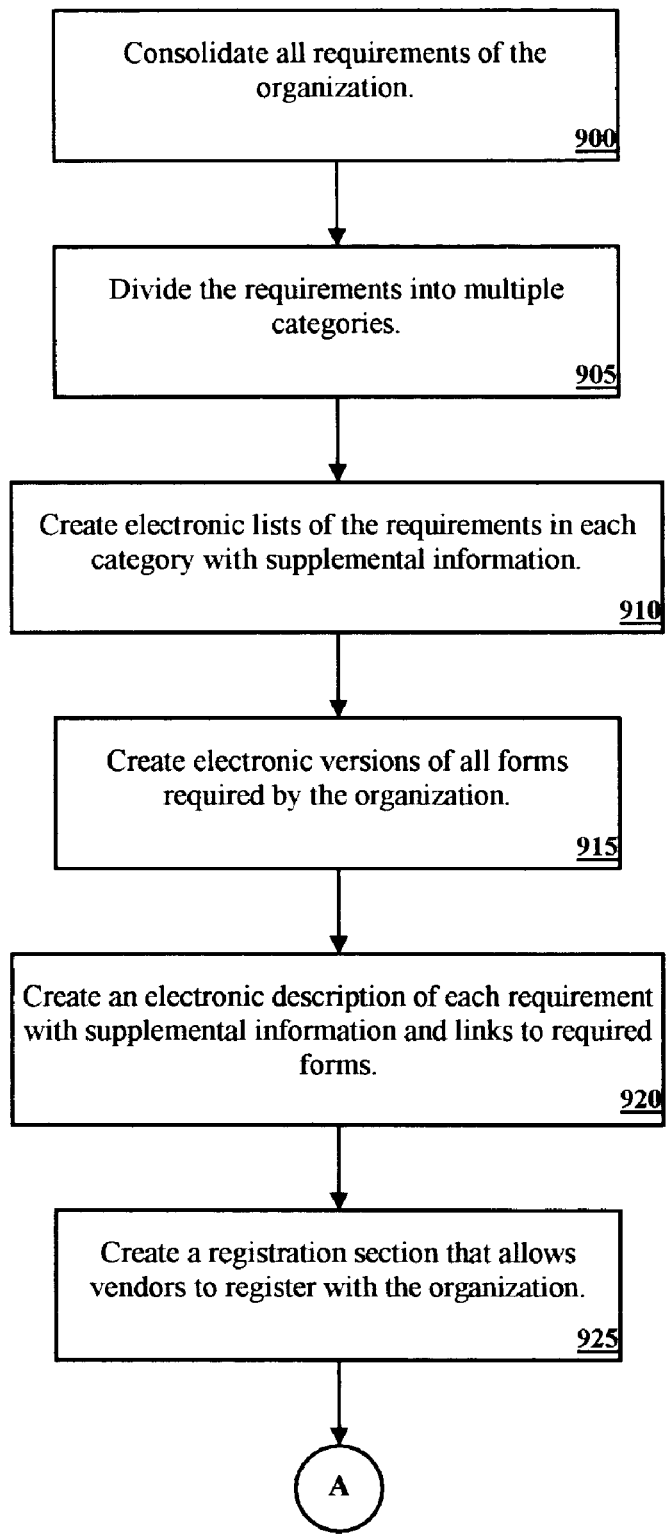
FIG. 9A is a flow chart showing exemplary steps in the present system.

FIG. 1 shows an exemplary home page for the present requirements publication system. The present system may take the form of a website published on the world wide web or a proprietary bulletin board with public access. In either form, the home page represents the first page that is presented to visitors. For clarity purposes the present system will be described as a website. The top of the home page includes the name of the buyer's organization 100 and a number of general information links 105 for use by vendors. A "search" link is provided so vendors can search for specific items, i.e., items that the vendor produces, markets or sells, without having to browse through the entire electronic publication. A "contact us" link is also provided. The "contact us" link will take the vendors to a page with contact information for the organization such as, e-mail address(es), mailing address(es), telephone number(s) and facsimile number(s). The welcome window 110 lets all visitors know the purpose of the website, which is to publish the products and services that the organization needs to buy. The present system targets vendors and is intended to make doing business with the organization easier and faster than traditional methods. Welcome window 110 may also provide some general information about the organization and special programs that are supported by the organization. In window 115, multiple categories of the products and services, collectively referred to as requirements, the organization is actively seeking to purchase are presented as hyperlinks. In FIGS. 1-8, any text that is underlined is intended to represent a hyperlink, or link, to another webpage. In the example of FIG. 1, the categories include: supply; services; and, construction. Of course, other categories may be employed in other embodiments.

FIG. 2 illustrates a page that the vendor is taken to when he clicks on the "supply" or "services" link of FIG. 1. In this example, two categories of requirements of have been shown on the same page. However, as will be evident in FIG. 3, each category could have its own dedicated webpage. Returning to FIG. 2, the name of the buyer's organization 100 is provided at the top of the page. The list of links 200 that are underneath of the buyer's organization includes a "home" link, which will return the vendor to the home page shown in FIG. 1. Supply window 205 provides a list of the supplies that the organization is seeking to purchase. Each supply requirement in the list includes a name of the supply, a brief description of the supply, a point of contact for the item, the date the requirement was posted, and the date of the latest update to the requirement. Of course, other information may be provided for each requirement. The name of the item and the name of the point of contact are provided as hyperlinks. When a vendor clicks on the name of the item, the vendor will be transported to a detailed description of the item. A sample detailed description will be discussed below in conjunction with FIG. 4. If the vendor clicks on, or selects, the name of the point of contact, the vendor will be taken to a page with contact information, e-mail address, telephone number, etc., for the contact person. The contact person has some knowledge of the requirement and can talk about the requirement with the vendor. Service window 210 provides a list of the services that the organization is seeking to procure. Each service in the list includes a name of the service, a brief description of the service, a point of contact, the date the requirement was posted, and the date of the latest update to the requirement. Again, the name of the service requirement and the name of the point of contact are provided as hyperlinks, with the links taking the vendor to a page with a detailed description of the requirement and a page with contact information for the contact person, respectively.

FIG. 3 illustrates a dedicated category page that vendors are taken to when they select the "construction" link from the homepage. The name of the buyer's organization 100 is provided at the top of the page, and is preferably provided at the top of each page in the present system. The list of links 200 that are underneath of the buyer's organization includes a "home" link, which will return the vendor to the home page of the website. Construction window 300 provides a list of the construction requirements of the organization. Each entry in the construction list includes a name of the requirement, a brief description of the requirement, a point of contact, the date the requirement was posted, and the date of the latest update to the requirement. As in the other category lists, the name of the item and the name of the point of contact are provided as hyperlinks, which will lead the vendor to a detailed description of the requirement and a page with contact information for the contact person, respectively.

FIG. 4 illustrates an exemplary detailed description page for a requirement of the organization. At the top of the page are the buyer's name 100 and the list of links 200. In this example, the detailed description window 400 relates to a "supply" requirement of the buyer, specifically a modelocked laser. Detailed description window 400 preferably includes the name of the requirement, a solicitation number assigned by the buyer, the date the requirement was posted, the date of the last update to the requirement, the closing date for receiving bids, the contact person, a full description of the requirement, a list of documents that vendors must fill out in order to do business with the buyer, and any special programs available to vendors, such as small business set asides. Of course, other information may also be provided. The required documents are preferably provided in a format that allows the vendors to edit the forms and submit filled out forms electronically. If a vendor is interested in selling the requirement to the buyer, then the vendor can click on the link provided in registration window 405. By registering with the buyer's organization, the vendor will automatically receive updates to the requirement that are made by the buyer. This registering process eliminates the need for the vendor to regularly check the buyer's website to see if there have been any changes to the requirement. A vendor arrives at the page shown in FIG. 4 by clicking on the modelocked laser link in supply window 205 of FIG. 2.

FIG. 5 illustrates an exemplary registration page for vendors. The buyer's name 100 and list of links 200 are provided at the top of the page. Registration window 500 provides multiple data entry fields that the vendor uses to provide the buyer's organization with all of the vendor's pertinent information. Registration window 500 provides data acceptance fields for a company name, a point of contact, a complete mailing address, fax and telephone numbers, an e-mail address, the vendor's business status, and a preferred method for contacting the vendor. The preferred contact method will be used to send updates to the vendor. The updates are preferably limited to the requirement for which the vendor registered. Of course, the vendor can register for more than one requirement. After the vendor has provided all of the information requested in the registration window 500, the vendor clicks on the "register" button at the bottom of the window 500 to register with the buyer. The vendor will then automatically be sent all updates related to the requirement. A vendor would arrive at the registration window by clicking on the register link in window 405 of FIG. 4.

FIG. 6 illustrates an exemplary page of the administration section of the present system, which is only available to members of the buyer's organization. FIG. 6 shows the administration index page. As usual, the buyer's name 100 is provided at the top of the page. The administration links 600 provided under the buyer's name allow the buyer or move throughout the administration section. The administration section of the website allows the buyer to organize all of the information received from vendors, including creating vendor mailing lists for each requirement, which will be discussed in conjunction with FIG. 8. Index window 605 lists each category, all of the requirements that have been posted under each category, and the order in which the requirements are shown in their respective categories. Index window 605 provides the buyer with a single page on which he can see what items are listed on the website and the order of their presentation to vendors. If the buyer wishes to change the order of presentation of the requirements, or the order of the categories, he would click on the order link in window 610. This link will take the buyer to another administration page that allows for ordering of the categories and of the requirements within each category.

FIG. 7 illustrates another page in the administration section, specifically an edit requirement page. Under the buyer's name 100 and the administration section links 700 is the edit requirement window 705, for the modelocked laser, in this example. The edit requirement window 705 allows the organization to change any of the multiple fields relating to the requirement. Edit requirement window 705 includes the name of the requirement, the requirement's solicitation number, the posted date, the closing date, the registration end date, the contact person for the buyer and his contact information, the detailed description for the requirement, any special programs applicable to the requirement and the category, or section, under which the requirement is currently listed. The edit requirement page also includes an edit solicitation link 710 and a remove solicitation link 715. The terms "requirement" and "solicitation" are used interchangeably herein and both refer to a product or service that is a need of the buyer's organization. The edit solicitation link 710 allows an administrator to move on to another page and edit another requirement. The remove solicitation link 715 allows an administrator to remove a listed requirement from the website once the requirement has been filled, for example. The last window 720 in FIG. 7 includes links to other areas within the administration section, including an area that allows an administrator to add documents to the website. Documents that may need to be added by an administrator include new forms required by the organization and documents that help describe a requirement of the organization, including documents with pictures or drawings.

FIG. 8 shows another administration page of the present system. The buyer's name 100 and administration links 700 are provided at the top of the page. Vendors window 800 provides a list of vendors that have registered for updates regarding a specific requirement, the modelocked laser in this example. Vendors window 800 includes the name of each vendor, an e-mail address for each vendor, and a delete subscription link for each vendor. By consolidating the vendors for each requirement, the buyer can quickly create mailing lists for all vendors that have registered for any requirement. In this example, each of the vendors listed e-mail as their preferred contact method during the registration process. Other contact methods may also be used to provide updates to vendors. The delete subscription link allows the buyer to delete any vendor from the list of registered vendors, if the vendor indicates that he is no longer interested in filling the requirement, for example. Solicitation documents window 805 shows the documents that the buyer has received for any particular requirement. The documents that have been received relating to the modelocked laser are presented in this example. Solicitation window 805 includes a list of all documents by name and the number of each document that has been received. Since the vendors are able to fill out and submit these forms to the buyer in electronic form, each form is easily stored and retrieved by the buyer. The names of each document are preferably links to pages that contain the documents submitted by the vendors.

FIG. 9A is a flow chart that shows the basic steps in the present method. In step 900, the buyer makes a consolidated list of all of the organization's requirements that it would like to publish. In step 905, the buyer divides the requirements into general categories that will be easily recognizable to vendors. In step 910, the buyer creates an electronic version of the list of requirements in each category. Each list of requirements preferably includes supplemental information for each requirement including a brief description of the requirement, a contact person within the buyer's organization, and dates relevant to the requirement. In step 915, the buyer creates electronic versions of all forms that vendors may be required to fill out and submit to the organization, in order to conduct business with the organization. The forms are preferably provided in editable form so that they may be filled out and submitted to the organization electronically. In step 920, a detailed description of each requirement is created in an electronic format. The detailed description preferably includes a name of the product or service, a detailed description of the product or service, relevant dates, a contact person, a link to each form that must be filled out by a vendor before the organization will consider procuring the requirement from the vendor, and any special programs for which the requirement qualifies. In step 925, an electronic registration section is created that allows vendors to register with the organization for any specified requirement(s). As mentioned above, once a vendor registers with the organization, he will automatically receive updates regarding the requirement(s) for which he registered. The remaining steps of the preferred method are continued in FIG. 9B.

Figure 9B:
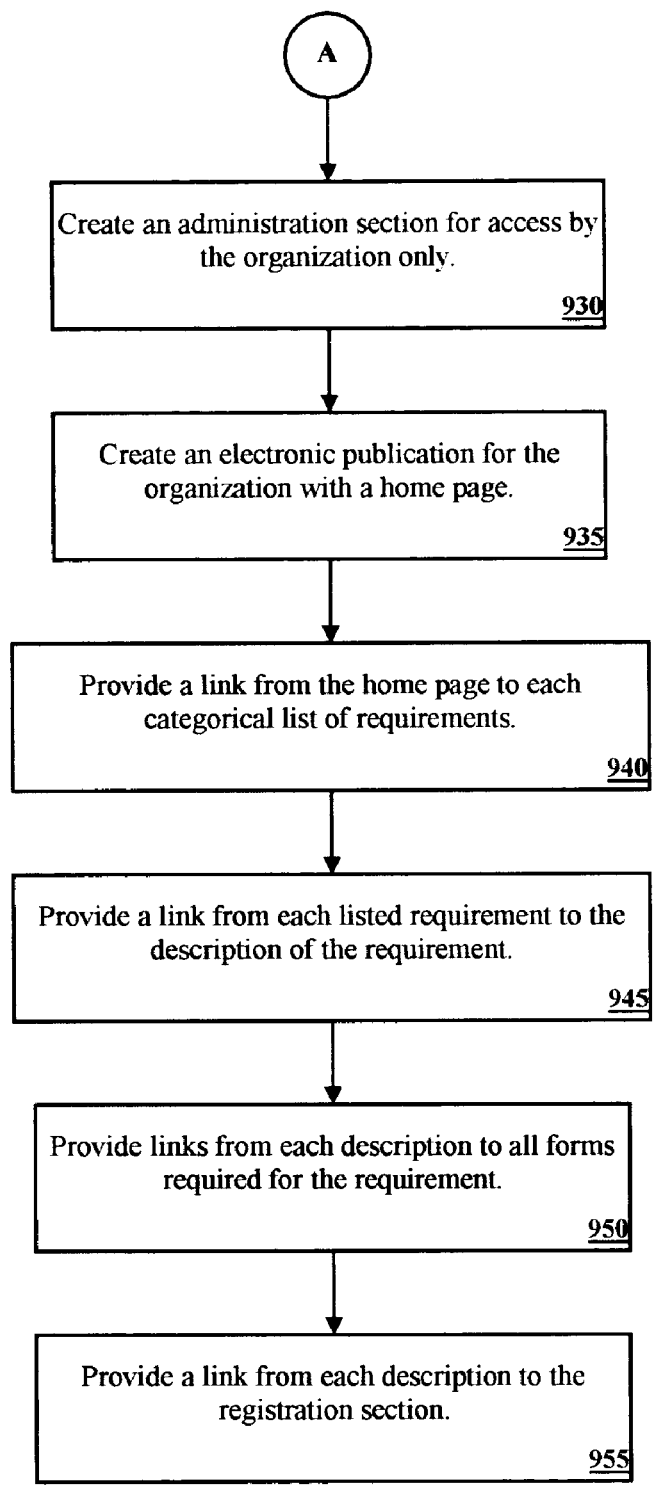
FIG. 9B is a flow chart showing other exemplary steps in the present system.

FIG. 9B is a flow chart that continues the steps of the preferred method, which began in FIG. 9A. In step 930, an electronic administration section is created that allows the buyer to view and organize vendor information, including the creation of mailing lists for registered vendors. The administration section is not accessible to the public, but rather is restricted to members of the buyer's organization. In step 935, an electronic publication for the buyer's organization that is accessible to the public is created. The electronic publication, which can be a website or a bulletin board system, includes a home page that is the first page presented to vendors. In step 940, a link is provided from the home page to each category of requirements. By following one of the links to a category, the vendor will be presented with a list of requirements that fall within the selected category. In step 945, a link is provided from the each requirement in the list of requirements to a detailed description of the requirement. Preferably, the name of the requirement acts as the link to the detailed description of the requirement. In this way vendors merely click on the name of a requirement in order to find out more information about the requirement, including what forms the vendor must fill out in order to be eligible to sell the requirement to the buyer's organization. In step 950, links are provided within each detailed description page to the forms required by the organization for that requirement. Thus, when a vendor has read the detailed description of the requirement and concluded that he can fill this need of the buyer, the vendor can immediately begin the transaction process. In step 955, a registration link is provided within each detailed description page wherein the registration link will take the vendor to a registration page. The registration page allows the vendor to register with the buyer to automatically receive updates regarding requirements in which the vendor is interested. Information provided by the vendors during registration, and forms submitted by vendors, can be organized by the buyer in the administration section of the electronic publication. While a specific number of steps have been discussed in a specific order, it will be understood by those skilled in the art that the same objective can be achieved with a different number of steps and that the steps mentioned above may be executed in a different order.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A method for electronically publishing a single organization's requirements in an electronic publication that provides vendors with information needed to do business with the organization and that can create individual lines of communication between the organization and the vendors, wherein the method reduces an amount of paperwork and time required for the organization to conduct business transactions with the vendors over traditional methods, the present method comprising the steps of:

categorizing the single organization's requirements into categories that are easily recognizable to the vendors, wherein each category includes one or more items required by the organization, and further wherein each item is a product or service required by the organization;

electronically publishing the single organization's requirements in a publication that is dedicated to the organization, wherein each item within the categories includes a name, a description, a contact person and one or more relevant dates, wherein a name of the contact person is presented as a hyperlink to an e-mail account of the contact person;

posting all forms and information necessary for the vendors to conduct business with the single organization, including a request for information form, a quotes form and a proposals form, in a format that allows editing of the forms by the vendors and submission of an edited form to the organization electronically; and, creating a registration section that allows the vendors to register with the single organization, wherein after registration the vendors can receive electronic notifications concerning any item specified by the vendors during registration;

wherein the organization's requirements, the forms and information necessary to conduct business with the organization, and the registration section are included in the electronic publication.

2. The method of claim 1, wherein the electronic publication is accessible to the organization and the vendors and further comprising the step of:

updating the description of an item and the forms necessary for the vendors, by the organization at any time.

3. The method of claim 1, further comprising the step of:

posting to the publication drawings, figures and pictures for viewing and possible downloading by the vendors, wherein the drawings, figures and pictures aid in conveying the organization's requirements to the vendors.

4. The method of claim 1, wherein the categories of the organization's requirements include construction, services and supplies.

5. The method of claim 1, wherein the electronic notification received by vendors that registered with the organization comprises an e-mail message, an instant message, a text message or a facsimile.

6. The method of claim 1, wherein the step of creating a registration section further comprises requiring the vendors to provide a preferred contact method that the organization will use for electronic notification purposes, and wherein the preferred contact method is used to send a confirmation message to the vendors confirming successful registration.

7. The method of claim 1, further comprising the step of:

creating an administration section that allows the organization to organize information relating to the vendors, including the creation of mailing lists that are used to send the electronic notifications to the vendors, wherein access to the administration section is restricted to members of the organization.

8. The method of claim 1, wherein the organization is able to add and delete information and pages to the electronic publication at any time.

9. The method of claim 1, wherein a single category or an individual item comprise multiple pages within the publication and the organization is able to specify the order in which the pages are presented for viewing.

10. The method of claim 1, wherein the publication comprises a home page and multiple other pages, and all of the other pages include a link that will return the vendors to the home page.

* * * * *